United States Patent [19]
Miller

[11] 4,081,753
[45] Mar. 28, 1978

[54] AUTOMATIC PROGRAMMING SYSTEM FOR TELEVISION RECEIVERS

[76] Inventor: Arthur O. Miller, 10141 Chesterton Dr., Dallas, Tex. 75238

[21] Appl. No.: 750,000

[22] Filed: Dec. 13, 1976

[51] Int. Cl.² .............................................. H04N 5/44
[52] U.S. Cl. .................................... 325/396; 358/191
[58] Field of Search ............... 325/389, 395, 396, 311; 368/191

[56] References Cited
U.S. PATENT DOCUMENTS
3,936,752  2/1976  Sasabe et al. ........................ 325/396

Primary Examiner—Robert L. Richardson
Attorney, Agent, or Firm—Richards, Harris & Medlock

[57] ABSTRACT

A television receiver programming and selection monitoring system is provided to permit a television viewer to preselect a television viewing schedule of desired television channels to be viewed during subsequent time periods. The system also permits the monitoring by a remote data processing center of the actual television programs viewed by the television viewer. The programming portion of the system includes first and second switches for preselecting a desired time period and for preselecting one of a plurality of television channels to be viewed during the preselected time period. A recording device is provided and is interconnected to the first and second switches. The system further includes a tone generator for producing a plurality of unique tones. The first switch is operable to drive the recording device and the second switch is operable to select and apply ones of the plurality of unique tones to the recording device, wherein the selected ones of the plurality of unique tones correspond to the preselected television channel. Through operation of the first and second switches the recording device generates a record of the preselected television viewing schedule. The monitoring portion of the system is operable to record ones of a plurality of unique tones depending upon the actual channel selected by the television viewer during a time period. The recording device is interconnected to a central data processing center over a communication link. The data recorded by the recording device is then transmitted to the central data processing center upon receipt of an interrogation signal.

15 Claims, 4 Drawing Figures

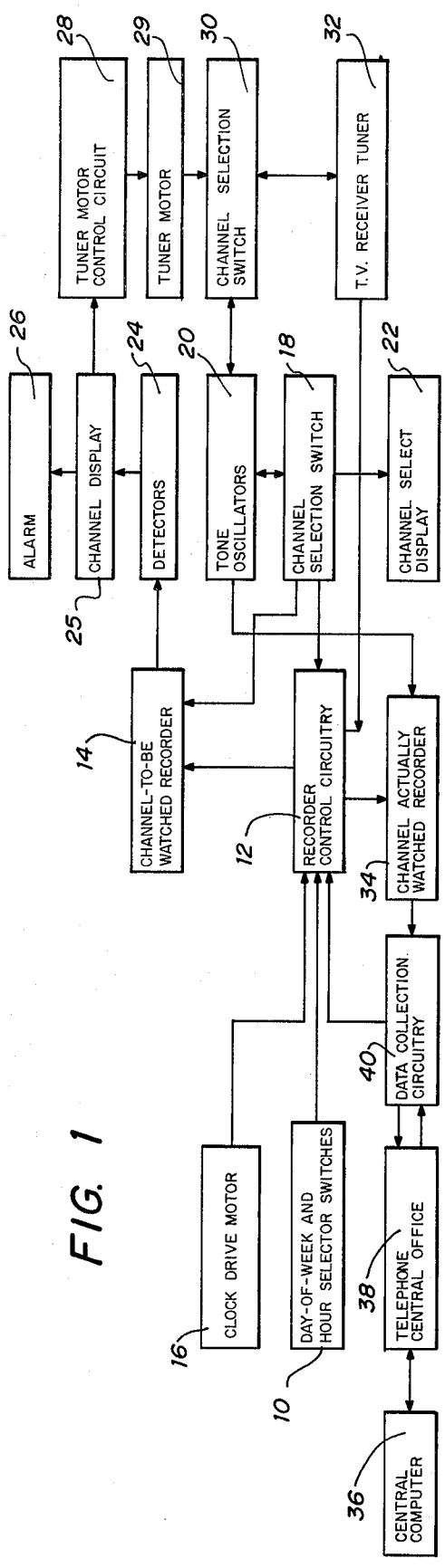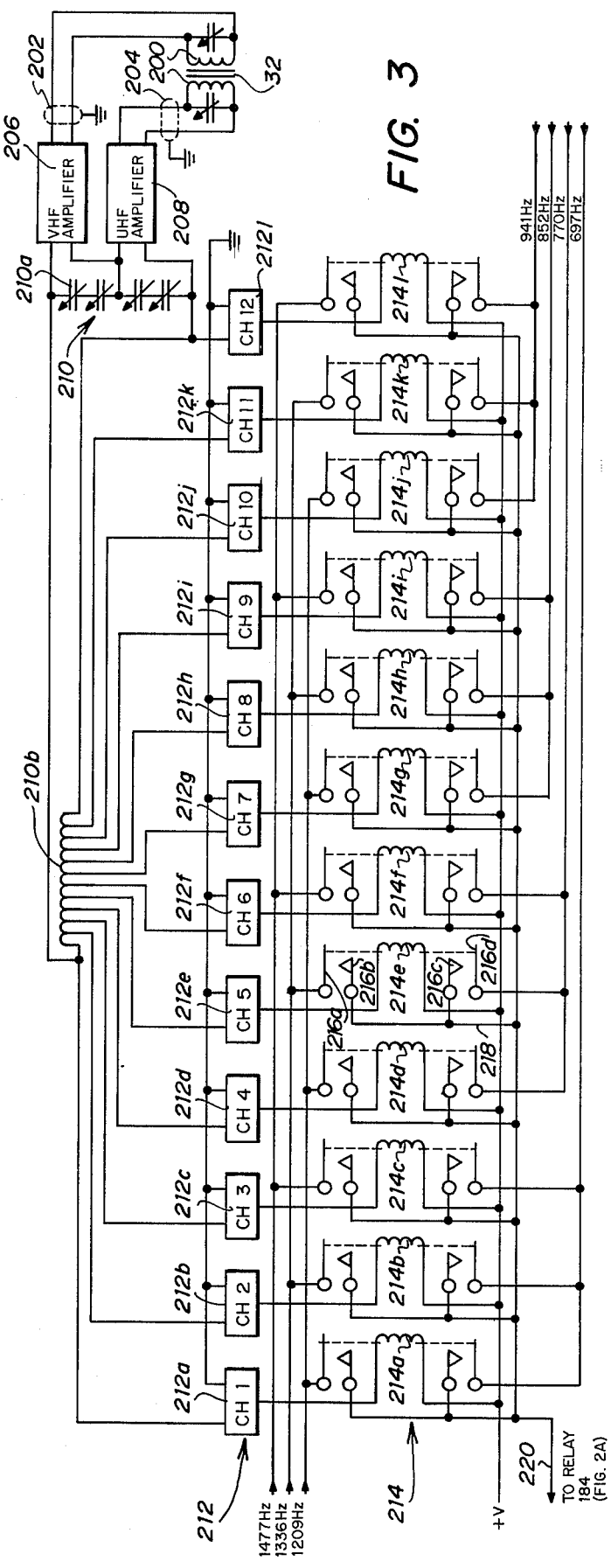

AUTOMATIC PROGRAMMING SYSTEM FOR TELEVISION RECEIVERS

FIELD OF THE INVENTION

This invention relates to programming and monitoring systems, and more particularly to a programmer for preselecting a television viewing schedule and for monitoring the actual television channels viewed by a television viewer.

THE PRIOR ART

Today's society increasingly relies upon the television's use as a medium for a source of news, education and entertainment. Television viewers frequently depend upon their daily newspapers or weekly television guides for programming information concerning the television programs they wish to watch over a particular time period. Frequently, however, by the time the television program is to be shown, the viewer has forgotten the television channel number and time, and as a result the program is missed.

Not only is scheduling information important to the television viewer, but persons responsible for the content of television programs and advertisers are also interested in the viewing habits of television viewers. Sampling techniques in the form of surveys are frequently undertaken to determine those television programs most frequently watched. Based upon these surveys, large amounts of money are expended for consumer-oriented advertising and other sums are risked on new types of shows which presumably would find favor with the viewing audience. Most polling techniques are, however, subject to errors, are slow to conduct and costly. All of these factors have a significant influence on the final results of the polls making them unreliable and untrustworthy. Previous polling techniques include polls taken by telephone or household visits, viewer recordation of the television programs viewed over a period of time and through the use of a special apparatus attached to the user's television set in the household of a participating viewer. In a latter technique the apparatus is interconnected to a central data processing center through a telephone line or in the case of subscription television through the television cable.

While the use of special apparatus interconnected to the viewer's television receiver has eliminated many of the objectional features of polls made by telephone or household visits, it has been found that significant errors still arise. These errors arise as a result of the nature of the apparatus attached to the television receiver, which transmits the identifying information to the central data processing station. Heretofore, such apparatus has proved to be costly and unreliable in monitoring the viewing habits of television viewers.

A need has thus arisen for a television monitoring system for monitoring the viewing habits of television viewers which is reliable, inexpensive and is operable without disturbing the viewer. Moreover, a need has arisen for a television monitoring system for use with subscription and nonsubscription television receivers which can be interrogated from a central data processing station. Further, a need has arisen for a television programming system to enable a viewer to preselect television channels to be viewed over a seven day time period.

SUMMARY OF THE INVENTION

In accordance with the present invention, a television receiver programming device for the preselection of a television viewing schedule of preselected time periods and television channels to be viewed by a television viewer at a subsequent time includes a first switch for programming a preselected time period and a second switch for programming a preselected one of a plurality of television channels. The programming device further includes a recording device interconnected to the first and second switches. A tone generator is provided to generate a plurality of unique tones, ones of the unique tones being representative of a television channel. The first switch is operable to actuate the recording device, while the second switch is operable to select and apply ones of the plurality of unique tones to the recording device, wherein the selected ones of the plurality of unique tones correspond to the preselected television channel. By operation of the first and second switches, the recording device generates a record of the preselected television viewing schedule by the television viewer.

A system for monitoring the use of a plurality of television receivers located at a plurality of remote locations in accordance with the present invention includes a generator for generating a plurality of unique tones, wherein ones of the tones correspond to a particular television channel being viewed by a television viewer. The system further includes a recording device for continuously recording the tones to generate a record corresponding to the particular channels viewed over a period of time by the television viewer. A communications link interconnects the recording device associated with each of the plurality of television receivers located at remote locations with a central office. The recording device is operable upon receipt of an interrogation signal to actuate the recording means to cause transmission via the communications link to the central office of the prerecorded information.

DESCRIPTION OF THE DRAWINGS

A more complete understanding of the invention and its advantages may best be understood by reference to the following description taken in conjunction with the accompanying drawings in which:

FIG. 1 is a block diagram of the television receiver programming and selection monitoring system of the present invention;

FIG. 3 is an alternate embodiment of one aspect of the present invention.

DESCRIPTION OF THE PREFERRED EMBODIMENT

System Block Diagram

Figure 2A:
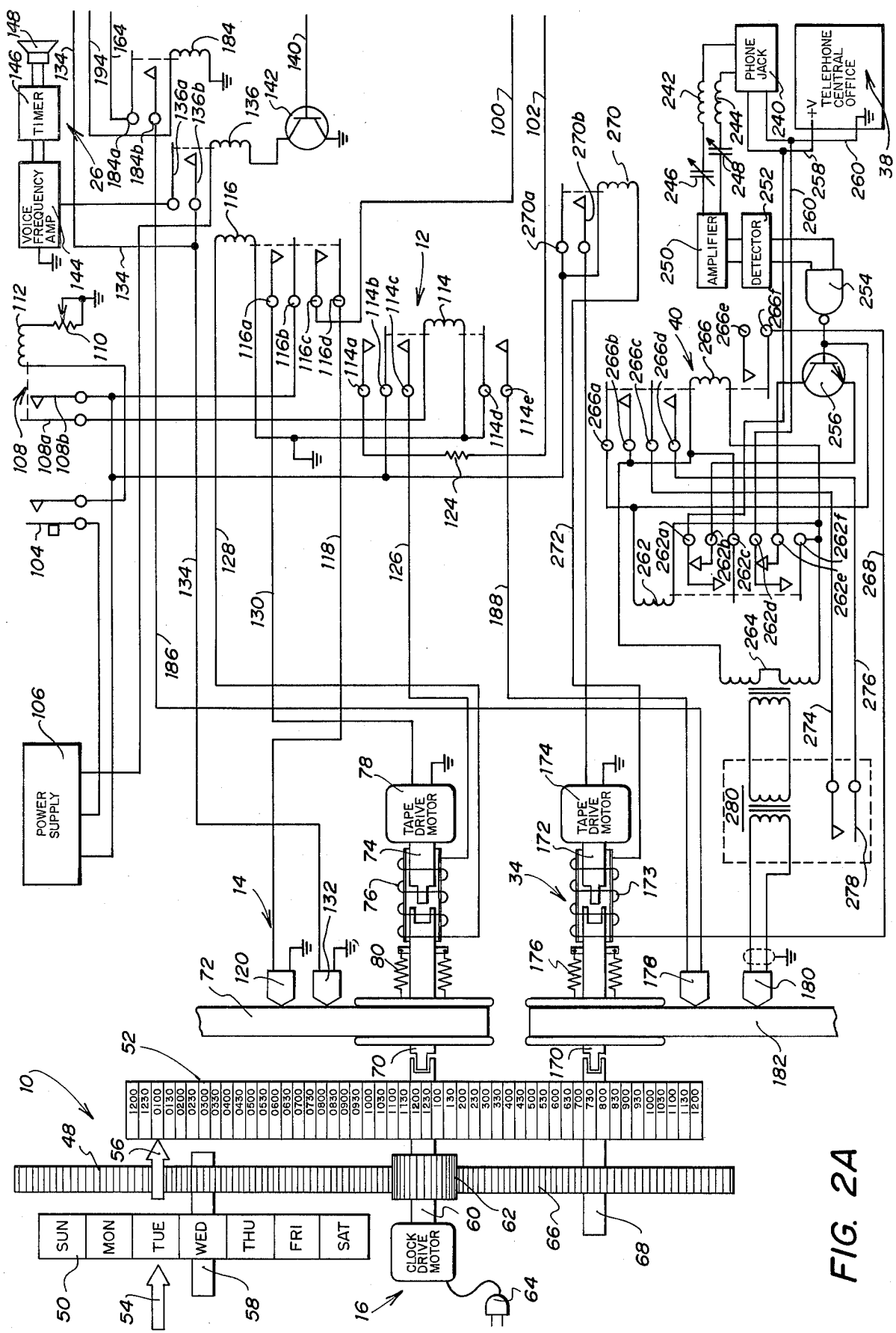
FIG. 2A is a portion of the schematic diagram of the system shown in the block diagram of FIG. 1.

Referring to FIG. 1, there is shown a block diagram of the present television receiver programming and selection monitoring system. The programming function of the present system includes day-of-week and hour selector switches 10 to enable the television viewer to preselect the time periods he desires to view television programs throughout the coming week. The day-of-week and hour selector switches 10 provide inputs to the recorder control circuitry 12. During the programming function, the recorder control circuitry 12 controls a channel-to-be watched recorder 14. The recording medium of the channel-to-be watched recorder 14 may comprise, for example, magnetic tape or motion picture projection film. The recording medium of the recorder 14 is advanced to reflect the position of the day-of-week and hour selector switches 10 under the control of the recorder control circuitry 12. After the programming function has been completed, the input to the recorder control circuitry 12 is transferred from the switches 10 to a clock drive motor 16. The clock drive motor 16 operates through the recorder control circuitry 12 to drive the recording medium of the recorder 14 during the seven day time period.

At each of the time periods selected by the viewer, through the operation of switches 10, the particular television channel to be viewed during that time period is selected using a channel selection switch 18. The channel selection switch 18 enables the television viewer to select any one of twelve different television channels to be viewed during the time period selected through switches 10. The channel selection switch 18 applies certain ones of unique tones generated by tone oscillators 20 to the channel to be watched recorder 14 for recordation by recorder 14 on the recording medium. The channel selection switch 18 applies a unique set of tones to the recorder 14 depending upon the particular television channel selected to be viewed at the subsequent time preselected by operation of switches 10. The channel selection switch 18 also provides an input to the recorder control circuitry 12 for advancing the recording medium of the recorder 14 while the particular tone is being applied to the recorder 14. The channel selection switch 18 is also interconnected to a channel select display 22. This display indicates to the television viewer the particular channel selection made through operation of switch 18 so that the selection can be verified.

The recorder control circuitry 12 advances the recording medium, in the preferred embodiment, for a period of three seconds, which corresponds to an actual viewing time of fifteen minutes. The television viewer continues to operate the day-of-week and hour selector switches 10 to choose the time periods in which he wishes to view television programs throughout the week. At each time period selected, the operator then selects the particular channel to be viewed during that time period by operation of the channel selection switch 18. Upon completing the selection of the entire seven day program, the switches 10 are set to reflect the actual day and time. The control of the recording medium of recorder 14 is then transferred from switches 10 to the clock drive motor 16 to advance the recording medium of the recorder 14 throughout the coming week period.

Throughout the week as the recording medium is advanced in the recorder 14 reflecting the actual time, the tones that were previously recorded, through the operation of switches 10 and 18, are played back by the recorder 14 and detected by detectors 24. The detectors 24 through logic circuitry decode the particular tones that had been previously recorded. Display 25 displays to the television viewer the number of the particular television channel that had been previously programmed for that particular day and time by operation of switches 10. Simultaneously with the display of the channel number preselected, an audible tone is sounded by an alarm 26 to indicate to the television viewer that the time has arrived for a television program that he had previously programmed.

In addition to alerting the television viewer that the preselected time has arrived and displaying to the viewer the number of the preselected television channel, the present system can also be utilized to actuate a television receiver and tune the television receiver to the correct channel. The output of the detectors 24 is applied to a tuner motor control circuit 28 and tuner motor 29. The motor 29 is interconnected through a channel selection switch 30 to a television receiver tuner 32. The operation of the tuner motor control circuit 28 and channel selection switch 30 will be subsequently described with reference to FIG. 2B.

The second basic function of the system of the present invention is to monitor the actual television channels viewed by a viewer and to transmit this data to a central computer for statistical analysis. The television tuner 32, when the television receiver is operative, will apply an input signal to the recorder control circuitry 12. The recorder control circuitry 12 will then actuate a channel actually watched recorder 34. The channel actually watched recorder 34 will then record tones applied from the tone oscillators 20 which represent the particular television channel actually being viewed during the particular time period. The television tuner 32 is interconnected to the channel selection switch 30. The channel selection switch 30 operates to sense the position of the channel selection knob of the television tuner and operates to apply certain ones of the tones generated by the tone oscillators 20 to the recording medium of the recorder 34. Through this process, a continuous record of the actual television channels viewed by a television viewer over a period of time is generated by the channel actually watched recorder 34. The information recorded by the recorder 34 is a sequence of tones, wherein each tone represents a particular channel viewed over a period of time, that are stored by the recorder 34 for future playback.

The information recorded by the recorder 34 is played back to a central computer 36 in response to an interrogation signal generated by the central computer 36. The interrogation signal is transmitted via telephone lines to a telephone central office 38. The interrogation signal is then transmitted via telephone lines from the telephone central office to a user's location for receipt by the data collection circuitry 40. If the proper interrogation signal is received by the data collection circuitry 40, an actuation signal will be generated by the circuitry 40 to the recorder control circuitry 12 for actuation of the channel actually watched recorder 34. Recorder 34 will then playback the previously recorded tones representing the channels actually watched by the television viewer to the telephone central office 38 via subscription telephone lines. This information will then be transferred from the telephone central office 38 to the central computer 36 for storage and subsequent analysis.

Programming Function

Figure 2B:
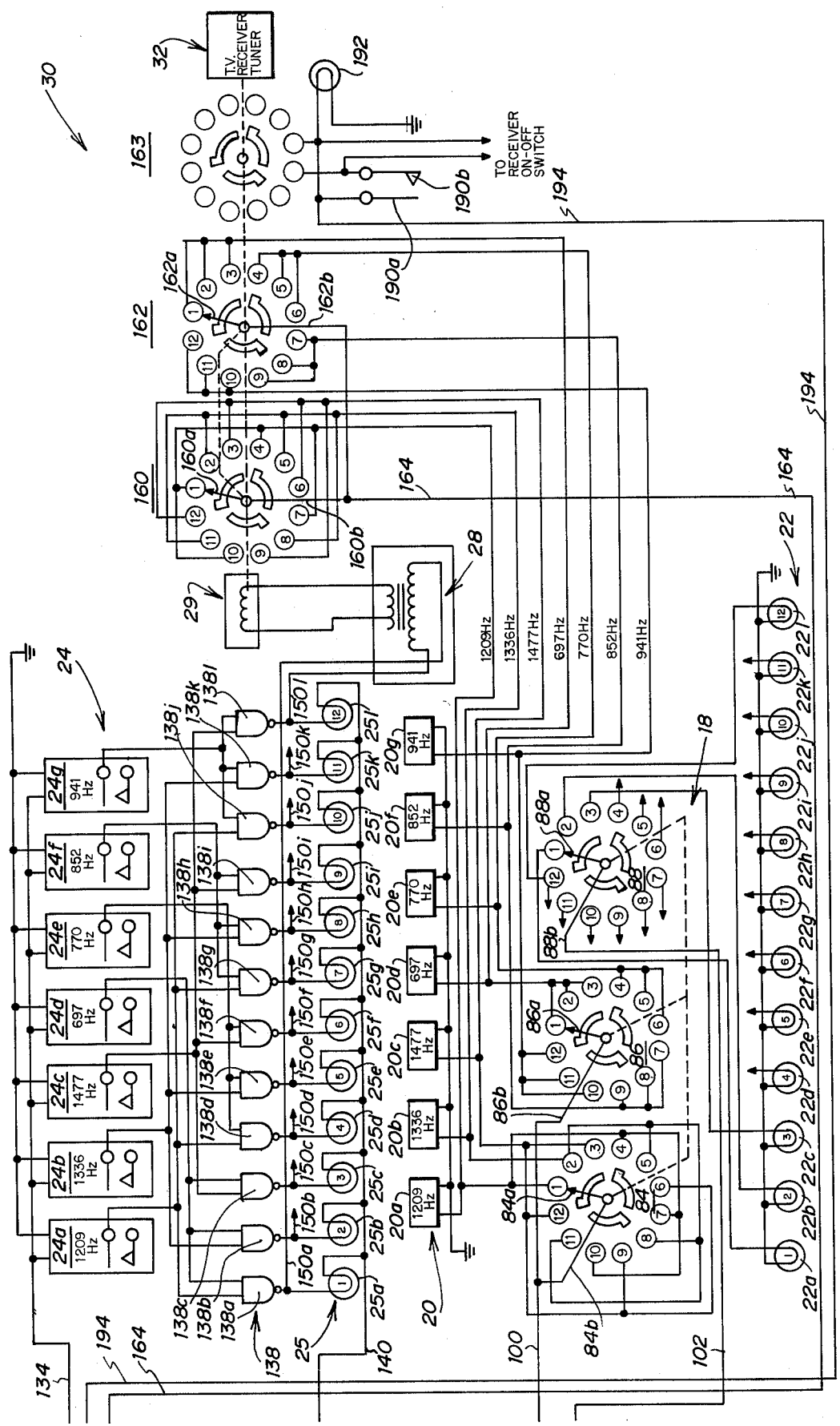
FIG. 2B is a portion of the schematic diagram of the system shown in the block diagram of FIG. 1.

FIGS. 2A and 2B illustrate the schematic circuitry which corresponds to the block diagram of the present programming and selection monitoring system shown in FIG. 1. FIGS. 2A and 2B are drawn to be matched in a side-by-side relationship to illustrate the entire electrical schematic. Referring to FIG. 2A, the day-of-week and hour selection switches 10 and their associated gears and shafts are illustrated. The day-of-week and hour selector switches 10 include a gear wheel 48 that is calibrated to turn a circular indicator gear wheel 50 showing the days of the week, Sunday through Saturday, on its surface. The indicator wheel 50 is manually operable to preselect the day of the week and also rotates a time of day indicator gear wheel 52. The time of day wheel 52 is calibrated in one-half hour intervals and can be set for fifteen minute time segments. The day-of-week indicator wheel 50 includes an associated pointer 54, and the time-of-day indicator wheel 52 includes an associated pointer 56 to indicate to the television viewer which day and time period is being programmed. The day-of-week indicator wheel 50 and time-of-day wheel 52 are ganged together using a shaft 58, such that as the day-of-week indicator wheel 50 is rotated from day to day, the time-of-day wheel makes a complete revolution from 12 o'clock A.M. to 12 o'clock P.M. During the programming operation therefor, the day-of-week indicator wheel 50 will have made one revolution while the time-of-day indicator wheel 52 will have made seven revolutions.

The gear wheel 48 is mounted to a clock drive shaft 60. Drive shaft 60 carries a drive gear 62, which is driven by the clock drive motor 16 after programming has been completed. The clock drive motor 16 is interconnected to a power supply through plug 64. In addition to driving the gear wheel 48 and day-of-week indicator wheel 50, the drive gear 62 also drives a gear wheel 66. Drive gear wheel 66 is mounted to a clock drive shaft 68. Drive gear wheel 66 and shaft 68 are associated with the channel actually watched recorder 34 (FIG. 1) to be subsequently described.

The clock drive shaft 60 is mechanically interconnected to a recorder drive shaft 70 associated with the channel to be watched recorder 14. The recorder drive shaft 70 is operable to advance the recording medium 72 which may comprise, for example, magnetic tape or motion picture projection film. For purposes of discussion, it will be assumed that the recording media is magnetic tape, however, motion picture projection film or magnetic wire can also be utilized. FIG. 2A indicates the positioning of drive shaft 60 and drive shaft 70 after the system has been programmed and is placed under the control of the clock drive motor 16. During programming, however, clock drive shaft 60 is disengaged from recorder drive shaft 70 and is caused to be engaged with tape drive shaft 74. Drive shaft 70 is caused to engage the drive shaft 74 by magnetically coupling shaft 70 to shaft 74 upon energization of coil windings 76. Drive shaft 74 is interconnected to a tape drive motor 78, which in the programming mode of operation rotates the recorder drive shaft 70 to advance the magnetic tape 72. When coil windings 76 are deactivated, springs 80 are biased to recouple the recorder drive shaft 70 to the clock drive shaft 60 to place the channel to be watched recorder 14 under the control of the clock drive motor 16.

Upon selecting a particular day and time using the day-of-week indicator wheel 50 and time-of-day indicator wheel 52, the television viewer will then program a particular television channel to be viewed during the particular time period. The selection of a particular channel will cause a unique tone to be applied to the channel to be watched recorder 14 for recordation on the magnetic tape 72. The particular tone representative of a designated television channel is generated through the use of the tone oscillators 20. The frequency of the tone oscillators 20 is selected to conform to the tones used to transmit numerals by the nationwide telephone dialing network over subscription telephone lines.

Referring to FIG. 2B, the tone oscillators 20 include oscillators 20a through 20g and generate tones having frequencies of 1209 Hz, 1336 Hz, 1447 Hz, 697 Hz, 770 Hz, 852 Hz and 941 Hz. By mixing two of these frequencies generated by the tone generators 20 a unique tone is generated representing a particular television channel. The combination of tones required to generate the necessary 12 unique tones representing 12 television channels and the oscillators utilized are noted in the table below. For example, to generate a tone representing the numeral 1 for television channel 1, the tones 1209 Hz and 697 Hz are mixed and applied to the channel to be watched recorder 14. To generate a tone representing television channel 9, tones having a frequency of 1477 Hz and 852 Hz are mixed and applied to the channel to be watched recorder 14.

| | | TONE OSCILLATOR NUMBER AND FREQUENCY | | |
|---|---|---|---|---|
| | | 20a<br>1209 Hz | 20b<br>1336 Hz | 20c<br>1477 Hz |
| TONE OSCILLATOR NUMBER AND FREQUENCY | 20d<br>697 Hz | Channel<br>1 | Channel<br>2 | Channel<br>3 |
| | 20e<br>770 Hz | Channel<br>4 | Channel<br>5 | Channel<br>6 |
| | 20f<br>852 Hz | Channel<br>7 | Channel<br>8 | Channel<br>9 |
| | 20g<br>941 Hz | Channel<br>10 | Channel<br>11 | Channel<br>12 |

The channel selection switch 18 (FIG. 1) is utilized to select the combination of tones corresponding to the particular television channel selected and to apply these tones to the channel to be watched recorder 14. The channel selection switch 18 includes a 3-position wafer switch comprising wafers 84, 86 and 88 (FIG. 2B). Wafer switches 84, 86 and 88 are ganged together, such that by operation of one control, the three switches are simultaneously positioned to the identical contact point within each wafer. The contact points for each wafer switch 84, 86 and 88 have been identified in FIG. 2B using the numerals 1–12, which correspond to the particular television channel selected by the television viewer in programming the system. Wafer switch 84 includes a contact arm 84a and an output arm 84b. Wafer switch 86 includes a contact arm 86a and an output arm 86b. Similarly, wafer switch 88 includes a contact arm 88a and an output arm 88b.

Through operation of wafer switches 84 and 86 the required combination of tones is applied to the recorder control circuitry 12. For example, as illustrated in FIG. 2B, if the television viewer selects channel 1 as the desired television channel to be viewed during a particular time period, the contact arms 84a and 86a will be positioned opposite the contact identified by the numeral 1 in switches 84 and 86. Contact arm 84a will then be interconnected to tone oscillator 20a to apply a tone having a frequency of 1209 Hz to the output arm 84b. This tone signal will then be applied to signal line 100 for application to the recorder control circuitry 12. Simultaneously, the contact arm 86a will be interconnected with tone oscillator 20d to apply a tone having a frequency of 697 Hz to the output arm 86b of wafer switch 86. This 697 Hz tone signal will be applied from the output arm 86b to signal line 100 for application to the recorder control circuitry 12. In a similar manner, had the viewer selected channel 6, contact arm 84a would interconnect tone oscillator 20c to the output arm 84b to apply a tone having a frequency of 1477 Hz to the recorder control circuitry 12 by signal line 100. The contact arm 86a of wafer switch 86 would interconnect tone oscillator 20e to the output arm 86b to apply a tone having a frequency of 770 Hz to the recorder control circuitry 12 via signal line 100.

The third wafer switch 88 is interconnected to the channel select display 22. Channel select display 22 includes lamp indicators 22a through 22l, representing the television channels 1 through 12. One of the display lamps 22 is illuminated to indicate to the television viewer the number of the television channel he has just programmed. Power is supplied to the channel select display lamps 22 via signal line 102 from the recorder control circuitry 12 to the contact arm 88b through contact arm 88a. As shown in FIG. 2B, contact arm 88a would apply power from the recorder control circuitry 12 to lamp 22a to indicate to the television viewer that he has programmed channel 1 for the particular time period selected through operation of the day-of-week indicator wheel 50 and time-of-day indicator wheel 52.

Referring to FIG. 2A, the recorder control circuitry 12 is illustrated. A channel select push button switch 104 is interconnected to a power supply 106. The power supply 106 provides the necessary voltages to the recorder control circuitry 12. Channel select push button switch 104 when depressed applies power from the power supply 106 to an adjustable timer 108. Adjustable timer 108 includes a variable resistor 110 and transformer 112 to control the length of time contacts 108a and 108b are closed. In the preferred embodiment, this time period is three seconds. The closing of contacts 108a and 108b of timer 108 applies power to a relay 114 having contact terminals 114a–114e. The recorder control circuitry 12 further includes a relay 116 having contact terminals 116a–116d. Relay 116 is interconnected via signal line 118 to a record head 120 of the channel to be watched recorder 14.

The operation of the programming function of the system of the present invention will now be described with respect to FIGS. 2A and 2B. When the television viewer has made a decision to watch television channel 1 on Tuesday at 1:00 A.M., he sets the day-of-week indicator wheel 50 and time-of-day indicator wheel 52 as shown in FIG. 2A. The pointer 54 indicates that Tuesday has been selected, while the pointer 56 indicates that the time 1:00 A.M. has been selected. The position of the day-of-week indicator wheel 50 and time-of-day indicator wheel 52 positions the magnetic tape 72 at the proper location relative to the record head 120. The television viewer then positions the channel selection switch 18 to channel 1 as shown in FIG. 2B. The outputs of tone oscillators 20a and 20d are then applied through the wafer switches 84 and 86 along signal line 100 to contact 116c of relay 116. Upon depressing the channel select push button 104, power is applied through the timer 108 to relay 114. The operation of relay 114 operates relay 116 through contacts 114b and 114c. The result is to close contacts 116c and 116d to apply the signal from signal line 100 to the record head 120 via signal line 118.

When the channel select switch 18 was positioned to channel 1, contact 1 on the wafer switch 88 is used to illuminate the channel select lamp 22a via signal line 102 through normally closed contacts 114a and 114b of relay 114. A voltage dropping resistor 124 is contained in signal line 102 to provide the necessary power for the channel select display lamps 120. When relay 114 operates, power is transferred from terminal 114a to terminal 114c of relay 114. This power transfer extinguishes the channel select lamp 22a and causes current to flow in coil windings 76 via signal line 126. The application of current to coil windings 76 applies power via signal line 128 to energize relay 116. The operation of relay 116 applies power from contact 116b to contact 116a via signal line 130 to the tape drive motor 78. As previously stated, relay 116 then applies the tone representing the preselected channel 1 from signal line 100 to signal line 118 for application to the record head 120 of the channel to be watched recorder 14. The energization of relay 116 occurs after energization of relay 114 to ensure that the record drive shaft 70 has engaged the tape drive shaft 74 prior to energization of the tape drive motor 78. After energized, the tape drive motor 78 will advance tape 72 to record the tones for television channel 1 that are applied to the record head 120 until the timer 108 opens, thereby deenergizing relay 114.

After the television viewer has completely programmed the system for the entire week, the recordation process is complete and the channel to be watched recorder 14 is then driven by the clock drive motor 16 to advance the magnetic tape 72. The magnetic tape 72 is caused to move past a read head 132 of the channel to be watched recorder 14. The output of the read head 132 is applied via signal line 134 to a relay 136 having contacts 136a and 136b. The output of read head 132 is also applied via signal line 134 to the detectors 24 (FIG. 2B). The detectors 24 comprise detectors 24a–24g which amplify and detect the presence of the previously recorded tones selected through the channel selection switch 18 during the programming function. Each of the detectors 24 operate to detect the presence of one of the previously recorded tones, for example, detector 24a detects the presence of a tone having a frequency of 1209 Hz, while detector 24g detects a tone having a frequency of 941 Hz. Each detector 24 has an output sufficient to drive an AND gate 138. In order to switch an AND gate 138, the presence of a particular combination of tones must be detected by the detectors 24. For example, AND gate 138d will be conductive if the presence of a tone having a frequency of 1209 Hz and a tone having a frequency of 770 Hz is detected by detectors 24a and 24e.

Assuming that the previously programmed day and time, Tuesday, 1:00 A.M. has arrived, the read head 132 will apply a tone via signal line 134 to detectors 24. The previously selected channel was channel 1, containing tones having frequencies of 1209 Hz and 697 Hz. Therefore, detectors 24a and 24d will detect the presence of these two tones and apply their outputs to AND gate 138a. The output of AND gate 138a is applied to a channel display lamp 25a. Lamp 25a is interconnected via signal line 140 to the base of a transistor 142 (FIG. 2A). The conduction of AND gate 138a through lamp 25a causes the transistor 142 to become forward biased to conduct, placing a ground on the signal line 140. Conduction of transistor 142 also applies a ground to operate relay 136 to close contacts 136a and 136b. The closing of contacts 136a and 136b activates a voice frequency amplifier 144, whose output is applied through an adjustable timer 146 to a loud speaker 148. Through the conduction of a particular AND gate 138 upon the detection of the required pair of tones by the detectors 24, a display lamp 25 is illuminated corresponding to the number of the channel previously programmed by the television viewer at the same time an audible tone is sounded by the speaker 148.

In addition to alerting the television viewer by illuminating a channel display lamp 25 and sounding an audible tone through speaker 148, the programming feature of the programming and selection monitoring system can be utilized to actuate the television receiver and tune the television tuner to the correct channel. Referring to FIG. 2B, the detectors 24 and channel display 25 operate as previously indicated. The outputs of AND gates 138 are applied via signal lines 150a–150l to the corresponding terminal on a tuner motor control circuit 28. The tuner 32 in the television receiver is coupled via a shaft extension (not shown) to the tuner motor 29. As an AND gate 138 conducts as a result of detecting a channel selection previously programmed and recorded on the channel to be watched recorder 14, the motor control circuit 28 energizes the proper coil on the multi-stop tuner motor 29. This energization rotates the motor shaft to rotate the tuner shaft. By applying the output signals of the AND gates 138 through the tuner motor control circuit 28 to the tuner motor 29 the system permits the actual tuning of the television receiver to the proper channel previously programmed for the particular time and day.

Monitoring Function

The second basic function of the programming and selection monitoring system of the present invention is to detect and record the channel actually watched as opposed to the television channel that the television viewer previously programmed as described above. Referring to FIG. 2B, a first embodiment of the channel detection circuitry is illustrated. This embodiment utilizes the tuner motor control circuit 28 and tuner motor 29 previously described. The channel selection switch 30 is mounted on the shaft connecting the television tuner 32 and the tuner drive motor 29. Channel selection switch 30 comprises three wafer switches 160, 162 and 163. Wafer switch 160 includes a contact arm 160a and an output arm 160b. Wafer switch 162 includes a contact arm 162a and an output arm 162b. As the television receiver tuner 32 is tuned from one channel to another, either by the tuner motor 29 or by the television viewer in the usual manner, the wafer switches 160 and 162 are turned to correspond to the channel actually being watched without regard to the channel originally programmed and recorded on the channel to be watched recorder 14. The wafer switches 160 and 162 are interconnected through their contacts, identified by numerals 1–12 on wafer switches 160 and 162 to the tone oscillators 20 in a manner similar to the interconnection of the wafer switches 84 and 86 of the channel selection switch 18. The output arms 160b and 162b apply the tones from the tone oscillators 20 for mixing to signal line 164 for application to the recorder control circuitry 12. The third wafer switch 164 is utilized to monitor television receiver on-off functions as will subsequently be described.

Referring to FIG. 2A, the operation of the channel actually watched recorder 34 will be described. The clock drive motor 16 drives the clock drive shaft 60, which in turn rotates the drive gear 62. Rotation of drive gear 62 rotates the gear wheel 66 to cause rotation of clock drive shaft 68. Drive shaft 68 is mechanically coupled to a recorder drive shaft 170. Recorder drive shaft 170 is magnetically coupled to a tape drive shaft 172 through the use of coil windings 173. A tape drive motor 174 is interconnected to the tape drive shaft 172. Biasing springs 176 are utilized to hold the tape drive shaft 170 against the clock drive shaft 68 in the non-programming mode of operation of the system. Clock drive shaft 68, recorder drive shaft 170 and tape drive shaft 172 operate in a similar manner as the clock drive shaft 60, recorder drive shaft 70 and tape drive shaft 74 of the channel to be watched recorder 14 as previously described. The channel actually watched recorder 34 also includes a record head 178 and a read head 180. The recording medium 182 driven by the channel actually watched recorder 34 may comprise magnetic tape, motion picture projection film or magnetic wire, similar to the recording medium 72 of the channel to be watched recorder 14.

It should be understood that as an alternative to the use of two independent recorders, 14 and 34, a single recording device having a multi-track tape and multiple recording and read heads can be utilized. It is also possible to utilize individual recorders for the channel to be watched and channel actually watched recorders, 14 and 34, having a common drive gear and shaft arrangement.

In the operation of the channel actually watched recorder 34, as the television receiver is tuned to the channel actually watched, the wafer switches 160 and 162 are mechanically positioned. The tones supplied from the tone oscillators 20 are applied to the proper contacts of the wafer switches 160 and 162. When the television receiver is tuned, for example, to channel 1, contact 1 of wafer switch 160 and contact 1 of wafer switch 162 are connected to mix frequencies 1209 Hz and 697 Hz to represent the channel 1. These frequencies are then applied via signal line 164 to a relay 184 (FIG. 2A). Relay 184 includes contacts 184a and 184b. When closed relay 184 provides an output along signal line 186 to the record head 178 of the channel actually watched recorder 34. The circuit for record head 178 is completed through normally closed contacts 114d and 114e of relay 114 along signal lead 188 to prevent recording unwanted tones while other functions are taking place.

Because the recording medium 182 is under the control of the clock drive motor 16, the channel being watched is recorded to correspond with the actual day and time period. The total hours of viewing are of statistical value, and since it would not be desirable to continue recording channels watched while the television receiver was tuned off, it is necessary to either record a zero on the recording medium 182 or leave blank spaces representing "off" periods of time. To accomplish this result, the television receiver on-off switch is parallelled with a pair of contacts 190a and 190b associated with the third wafer 163 of the channel selection switch 30 (FIG. 2B). When the television receiver is turned on, power is supplied from the television receiver to a lamp indicator 192 positioned behind the television tuner dial to illuminate a display within the television receiver of the channel being watched. Indicator lamp 192 is under the control of the television receiver on-off switch. A signal lead 194 is interconnected from the indicator lamp 192 to the relay 184 (FIG. 2A) to control the tone signal line 164 to the channel actually watched record head 178. When the television receiver is on, relay 184 is energized through contacts 184a and 184b to apply the tone signal via signal line 186 to the record head 178 with contacts 114d and 114e of relay 114 being normally closed to ground. Relay 184 prevents the record head 178 from recording while the television receiver is off. This arrangement will require the central computer 36 (FIG. 1) upon receipt of the recorded data to interpret a "no tone" interval on the recording medium 182 as an indication that the television receiver was off. As an alternative, the relay 184 can be operated to close a set of contacts to apply a zero tone to the channel actually watched recorder head 178, thereby recording the fact that the television receiver was off during a period of time on a positive basis. The central computer 36 in this latter instance would recognize the tone for zero as off time and include this in the statistical data analysis.

A second embodiment for the recording of the channel actually watched is illustrated in FIG. 3. Unlike the previous embodiment where mechanical control of the television receiver was required by the channel selection switch 30, this second embodiment has no electrical-mechanical control of the television receiver. Referring to FIG. 3, the schematic circuitry for generating data representative of the channel actually watched for application to the channel actually watched record head 178 is illustrated. A two section tuned pickup coil 200 is placed in close proximity to the television receiver tuner 32 or to the television receiver intermediate frequency section. The pickup coil 200 is in two sections, one being for the VHF and the other for the UHF television receiver sections. Shielded leads 202 and 204 carry the induced tuner frequencies from the pickup coil 200 to the monitoring system. These signals are amplified through a VHF amplifier 206 and a UHF amplifier 208 and then applied to a series of bandpass filters 210. Bandpass filters 210 include a plurality of variable capacitors 210a and associated inductors 210b. There is a bandpass filter 210 tuned to the frequency of every channel available in the system. Each filter 210 will generate a corresponding signal representative of the channel selected to one of the channel detectors 212. Each detector 212a through 212l, when activated by a signal from the bandpass filter 210 will close a lead to ground to operate a channel number relay 214.

The tones generated by the tone oscillators 20 are applied to the channel number relays 214, which when activated generate the required tone corresponding to one of the possible television channels. For example, if relay 214e is activated by operation of channel detector 212e, the tone having a frequency of 1336 Hz will be applied from contact 216a to contact 216b for output along signal line 218, and a tone having a frequency of 770 Hz will be applied from contact 216d to contact 216c for output along signal line 218. The combined tones will be mixed along signal line 220 for application to relay 184 (FIG. 2A). The channel actually watched record head 178 is enabled via contacts 184a and 184b of relay 184, which is operated to ground from the power supplied from the television receiver lead that illuminates the lamp 192 (FIG. 2B).

Referring to FIG. 2A, the data collection circuitry 40 and interrogation process from a central computer will now be described. The channel actually watched recorder 34 while the television receiver was in use, was under the control of the clock drive motor 16. It has, therefore, recorded all channel watched data throughout the entire week. Since the tones were recorded at a constant rate under the control of the clock drive motor 16, these tones can now be "read out" in sequence by channel watched corresponding to the exact day and time period. The process of accessing the system from a central computer in a remote city is accomplished by transmitting an interrogation signal via subscription telephone lines to the television viewer's location. The interrogation signal actuates the channel actually watched recorder 34 to play back the programming information previously recorded.

The telephone numbers of participating system owners are programmed in a centrally located computer 36 (FIG. 1). This program includes the telephone number of each participating user and has the capability of outpulsing this number to "call" the user. The computer program also contains information to cause the computer to send two or more unlocking tones continuously, after the telephone number is transmitted. These unlocking tones are transmitted over telephone lines 258 and 260 from the telephone central office 38. The unlocking tones are presented through a telephone jack 240 at the user's location to the proper number of highly selective, sharp cut-off filters 242 and 244. Filters 242 and 244 are coupled to the data collection circuitry 40 through variable capacitors 246 and 248. When the correct unlocking tones are received and transmitted by the filters 242 and 244, the tones are amplified by an amplifier 250 and detected by detector 252. The amplified and detected unlocking tones are then presented to an AND gate 254. While the use of only two unlocking tones is described, additional tones may be required with additional filters and AND gate inputs to identify the specific television user being polled by the central computer 36.

When the correct number of unlocking tones have been presented to AND gate 254, the output of AND gate 254 causes a transistor 256 to conduct, thereby placing a short across the telephone lines 258 and 260. The short across telephone lines 258 and 260 has the same effect as lifting the telephone receiver to answer an incoming telephone call. The short occurs almost instantaneously when the call connection is established, thereby preventing ringing of the user's regular telephone. The data collection circuitry 40 is activated only when the specially coded unlocking tones are received. Conduction by AND gate 254 supplies a ground from telephone line 260 through contacts 262d and 262e of relay 262 to contacts 262a and 262b of relay 262 to telephone line 258 to complete the short circuit. When transistor 256 conducts, a path to ground is established from the output of AND gate 254, through the windings of relay 262 to the telephone central office ground on telephone line 260. When relay 262 operates, the "make-before-break" contacts 262a through 262f transfer control of the telephone lines 258 and 260 from the low resistance, which terminated the telephone line, to a transformer 264 whose primary coil is approximately 600 ohms. The impedance of transformer 264 is the correct impedance of the telephone lines 258 and 260 and allows the system to transmit the prerecorded tones from the channel actually watched recorder 34 to the central computer 36 via the telephone central office 38.

After the transfer of placing the primary coil of transformer 264 across the telephone lines 258 and 260, power is supplied from the telephone central office 38 to a relay 266. The energization of relay 266 closes contacts 266e and 266f to place, via signal line 268, a ground on the coil winding 173. As a result, the recorder drive shaft 170 is decoupled from the clock drive shaft 68, and a relay 270 via signal line 272 is energized. Contacts 270a and 270b of relay 270 close to actuate the tape drive motor 174 to drive the magnetic tape 182 past the read head 180 of the channel actually watched recorder 34.

The operation of relay 266 caused contacts 266c and 266d to close, which through signal lines 274 and 276 causes a switch 278 to actuate a tone amplifier 280. Tone amplifier 280 is interconnected to the read head 180 of the channel actually watched recorder 34. The prerecorded tones are then read from magnetic tape 182 and applied through the tone amplifier 280, transformer 264 and relay 262 to the telephone lines 258 and 260 for transmission to the central computer 36.

The magnetic tape 182 in addition to the prerecorded programming information includes a series of tones corresponding to the user's identification numbers. This identification information is also transmitted to the central computer 36. After the magnetic tape 182 has made a complete revolution, the user's identification information is presented to the central computer 36 for a second time. This second receipt of identification information signals the computer that transmission is complete and that the telephone lines are to be disconnected. Relay 266 is then deenergized and the transformer 264 is disconnected from the telephone lines 258 and 260. At this time there is no signal presented to AND gate 254 and relay 262 is deenergized to return the system to the other functions previously described.

While only two embodiments of the invention are shown and described herein, it will be evident to those skilled in the art that numerous modifications and alterations may be made thereto without departing from the spirit and scope of the invention as set forth in the appended claims.

What is claimed is:

1. A television receiver programming device for preselection of a television viewing schedule of preselected time periods and television channels to be viewed by a television viewer at a subsequent time comprising:
   first switch means for programming a preselected time period;
   second switch means for programming a preselected one of a plurality of television channels for viewing at said preselected time period;
   recording means including a recording medium and a drive means for driving said medium interconnected to said first and second switch means;
   said first switch means being operable to actuate said drive means;
   means for generating a plurality of unique code signals; and
   said second switch means being operable to select and apply ones of said plurality of unique code signals to said recording medium wherein said selected ones of said plurality of unique code signals correspond to said preselected one of said plurality of television channels, such that by operation of said first and second switch means, said recording means generates a record on said recording medium of the preselected television viewing schedule.

2. The programming device of claim 1 and further including:
   means for detecting said recorded ones of said plurality of unique code signals; and
   display means operable in response to said detection means for displaying the channel number of said desired one of said plurality of television channels at said preselected desired time period to indicate to the viewer that the preselected television channel is to be viewed.

3. The programming device of claim 2 and further including means operable in response to said detection means for generating an audible tone to indicate to the viewer that the preselected time period has arrived.

4. The programming device of claim 1 wherein said first switch means includes means for programming a day of the week and means for programming the hours of a day.

5. The programming device of claim 4 wherein said means for programming a day of the week is operable to sequentially select each day of the week and said means for programming an hour of a day is operable to sequentially select each hour of said programmed days of the week.

6. A programming device for programming a television receiver for preselection of a television viewing schedule of preselected time periods and television channels to be viewed by a television viewer at a subsequent time comprising:
   first switch means for programming a preselected time period;
   second switch means for programming a preselected one of a plurality of television channels for viewing at said preselected time period;
   first recording means including a first recording medium and a first drive means for driving said first medium interconnected to said first and second switch means;
   said first switch means being operable to actuate said first drive means;
   means for generating a plurality of unique code signals;
   said second switch means being operable to select and apply ones of said plurality of unique code signals to said first recording medium wherein said selected ones of said plurality of unique code signals correspond to said preselected one of said plurality of television channels, such that by operation of said first and second switch means, said first recording means generates a record on said first recording medium of the preselected television viewing schedule;
   means for detecting said recorded ones of said plurality of unique code signals; and
   third switch means interconnected to said means for detecting and the television receiver and operable in response to said means for detecting for automatically actuating the television receiver and for selecting the television channel previously programmed.

7. The programming device of claim 6 and further including:
   second recording means including a second recording medium and a second drive means for driving said second medium interconnected to said third switch means; and
   said third switch means being operable to select and apply ones of said plurality of unique code signals to said second recording medium wherein said selected ones of said plurality of unique code signals correspond to the television channels actually viewed by the television viewer to thereby generate a record on said second recording medium of the actual television channels viewed by the television viewer.

8. The programming device of claim 7 and further including:
- means for interrogating said second recording means; and
- means for transmitting said recorded ones of said plurality of unique code signals on said second recording medium to a remote station.

9. In a television receiver having a tuner and channel selector control, a programming device for preselection of a television viewing schedule of preselected time periods and television channels to be viewed by a television viewer at a subsequent time comprising:
- first switch means for sequentially preselecting each day of the week to be programmed;
- second switch means for sequentially preselecting the hours of each day preselected by said first switch means;
- third switch means for preselecting one of a plurality of television channels to be viewed at the day and hour selected by said first and second switch means;
- recording means including a recording medium and a drive means for driving said recording medium;
- said first and second switch means being operable to actuate said drive means;
- means for generating a plurality of unique tones;
- said third switch means being operable to select and apply ones of said plurality of unique tones to said recording medium wherein said selected ones of said plurality of unique tones correspond to said preselected television channel for recordation on said recording medium corresponding to said day and hour preselected by operation of said first and second switch means, such that said recording means generates a record on said recording medium of the preselected television viewing schedule;
- means for detecting said recorded ones of said plurality of unique tones;
- display means operable in response to said detection means for visually displaying to the television viewer at the preselected time the channel number of the television channel previously programmed; and
- means for generating an audible signal to indicate to the television viewer that the preselected time period has arrived.

10. The programming device of claim 9 wherein said tones have a frequency selected from the group consisting of:
- 1209 Hz, 1336 Hz, 1477 Hz, 697 Hz, 770 Hz, 852 Hz, and 941 Hz.

11. The programming device of claim 9 and further including:
- fourth switch means interconnected to the television tuner; and
- means interconnected to said fourth switch means and said means for detecting for selectively rotating the channel selector control of the television receiver to the preselected television channel and for activating the television receiver.

12. The programming device of claim 11 wherein said fourth switch means is interconnected to said tone generator means for generating a unique tone corresponding to the particular television channel being viewed by the television viewer; and
- means for applying said unique tone to said recording medium for recording the actual television channels viewed by the television viewer at a particular day and hour of the day.

13. The programming device of claim 11 and further including means for generating a unique tone corresponding to the frequency of the television channel being viewed by the television viewer; and
- means for applying said unique tone to said recording medium for recording the actual television channels viewed by the television viewer at a particular day and hour of the day.

14. The programming device of claim 11 wherein said recording means comprises:
- a magnetic tape recorder having a first transducer for recording tones representing preselected television channels in response to operation of said third switch means;
- a second transducer for applying recorded tones to said detection means;
- a third transducer for recording tones representing the television channels actually viewed by the television viewer in response to operation of said fourth switch means; and
- a fourth transducer for applying recorded tones representing the television channels actually viewed by the television viewer to a remote station.

15. The programming device of claim 11 wherein said recording means comprises:
- a first magnetic tape recorder including a first transducer for recording tones representing preselected television channels in response to operation of said third switch means and a second transducer for applying recorded tones to said detection means; and
- a second magnetic tape recorder including a first transducer for recording tones representing the television channels actually viewed by the television viewer in response to operation of said fourth switch means and a second transducer for applying recorded tones representing the television actually watched to a remote station.

* * * * *